United States Patent
Bhaskar et al.

[11] Patent Number: 6,154,499
[45] Date of Patent: *Nov. 28, 2000

[54] COMMUNICATION SYSTEMS USING NESTED CODER AND COMPATIBLE CHANNEL CODING

[75] Inventors: Bangalor Ramachandra Rao Udaya Bhaskar, North Potomac; Farhad Hemmati, Rockville, both of Md.

[73] Assignee: Comsat Corporation, Bethesda, Md.

[*] Notice: This patent issued on a continued prosecution application filed under 37 CFR 1.53(d), and is subject to the twenty year patent term provisions of 35 U.S.C. 154(a)(2).

[21] Appl. No.: 08/734,086

[22] Filed: Oct. 21, 1996

[51] Int. Cl.[7] .................................................. H04L 27/00
[52] U.S. Cl. .......................... 375/259; 704/200; 375/316
[58] Field of Search ...................... 704/200, 201, 704/207, 261; 371/5.1, 5.2, 6, 37.9, 37.6, 41; 375/259, 260, 341, 262; 341/94; 714/705, 704, 709, 760, 757, 774

[56] References Cited

U.S. PATENT DOCUMENTS

| | | |
|---|---|---|
| 3,975,587 | 8/1976 | Dunn et al. |
| 4,890,328 | 12/1989 | Prezas et al. |
| 4,912,764 | 3/1990 | Hartwell et al. |
| 4,945,549 | 7/1990 | Simon et al. |
| 5,204,876 | 4/1993 | Bruckert et al. |
| 5,214,656 | 5/1993 | Chung et al. ............................. 371/43 |
| 5,243,629 | 9/1993 | Wei. |
| 5,289,501 | 2/1994 | Seshadri et al. |
| 5,313,490 | 5/1994 | Schramm et al. |
| 5,371,737 | 12/1994 | Nelson et al. |
| 5,404,394 | 4/1995 | Dimolitsas et al. |
| 5,416,797 | 5/1995 | Gilhousen et al. |
| 5,442,625 | 8/1995 | Gitlin et al. |
| 5,448,593 | 9/1995 | Hill. |
| 5,467,132 | 11/1995 | Fazel et al. ............................. 348/390 |
| 5,504,776 | 4/1996 | Yamaura et al. |
| 5,546,420 | 8/1996 | Seshadri et al. .......................... 375/200 |
| 5,557,639 | 9/1996 | Heikkila et al. .......................... 375/224 |
| 5,581,580 | 12/1996 | Lindbom et al. ......................... 375/340 |
| 5,666,370 | 9/1997 | Ganesan et al. ...................... 371/37.01 |
| 5,691,992 | 11/1997 | Molnar et al. .......................... 371/37.1 |
| 5,701,294 | 12/1997 | Ward et al. .............................. 370/252 |

OTHER PUBLICATIONS

Hagenauer et al., variable rate sub–band speech coding and matched channel coding for mobile radio channels, IEEE, pp. 139–146, Sep. 1988.

Hagenauer et al., a sub–band coder designed for combined source and channel coding, IEEE, pp. 235–237, Sep. 1988.

*Primary Examiner*—Chi H. Pham
*Assistant Examiner*—Jean B. Corrielus
*Attorney, Agent, or Firm*—Sughrue, Mion, Zinn, Macpeak & Seas, PLLC

[57] ABSTRACT

A communication network, comprising data transmission and data receiving systems and operations, for carrying reliable voice communications, particularly for mobile communications applications involving land-mobile, aeronautical and maritime systems. Because the quality of the links in such systems may vary, the present invention combines a nested codec with a channel coder at the transmission side of the link and a decoder at the reception side. The nested codec will transmit at a constant rate, which is the highest bit rate possible in the system, but according to channel conditions, will reconstruct voice at different bit rates. Thus, for example, transmission will always occur at a rate of 3600, but the reconstruction of the transmitted signal will be at 2400 or 1200 bps, depending on the quality of the signal. Notably, the lower two rates are subsets of the higher rate, thus defining their "nested" characteristic. Moreover, the rate reductions from the constant maximum rate occur automatically at the receiver, without transmitter control, based on the detected degraded conditions at the receiver. Because the rates are nested, they are a known multiple of the lowest rate.

22 Claims, 9 Drawing Sheets

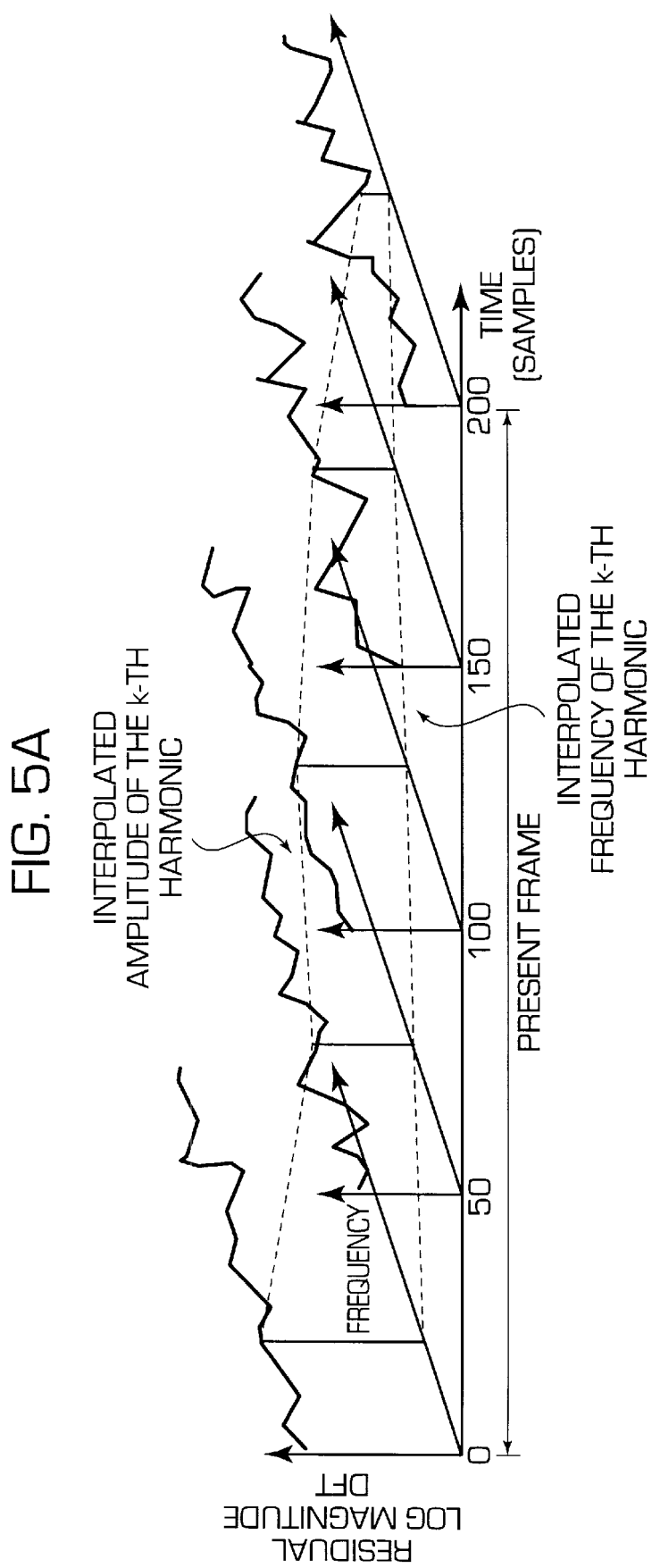

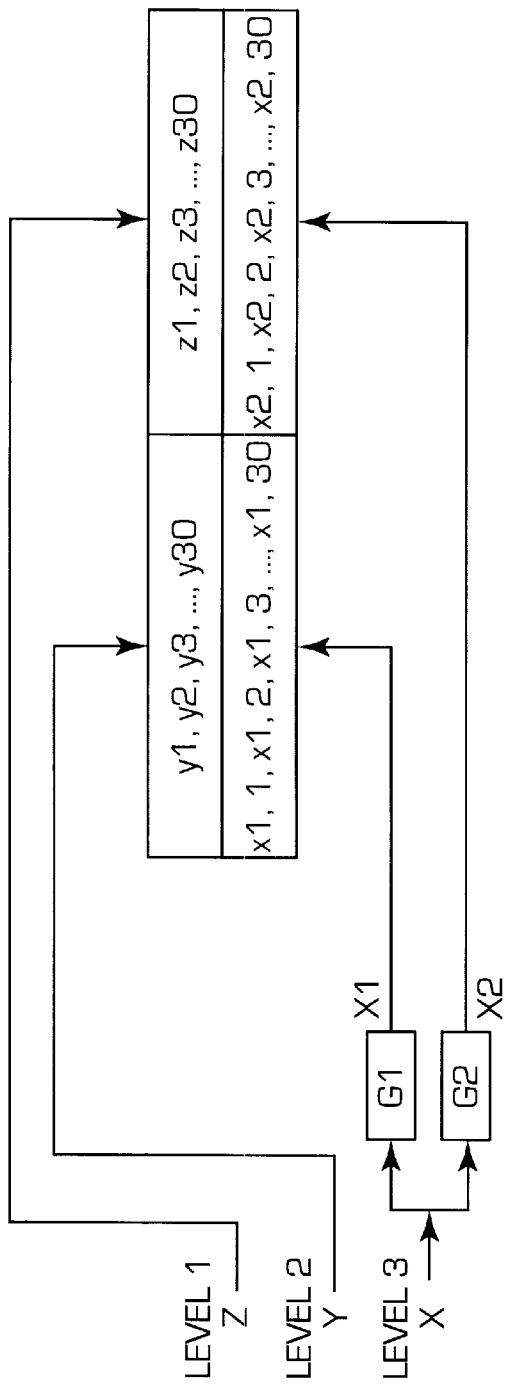
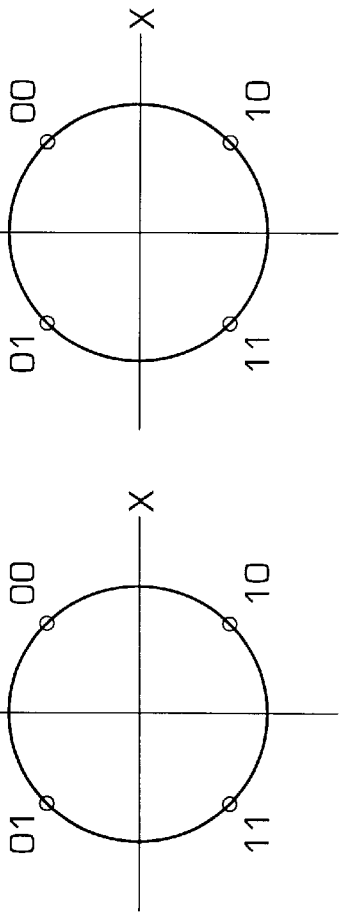

COMMUNICATION SYSTEMS USING NESTED CODER AND COMPATIBLE CHANNEL CODING

BACKGROUND OF THE INVENTION

The present invention is related to communication networks which require reliable voice communication services over widely varying environmental conditions. In particular, the invention concerns the design of components for the processing of signals carrying voice information in the transmission and receiver systems of a communication network.

With the advent of low cost miniaturized hand sets for voice communication, particularly, those which rely upon wireless or satellite communication links, offering the opportunity for communication from widely diversified geographical locations or under widely varying conditions, there is a need for signal processing techniques and equipment that will ensure reliable transmission and reception of signals carrying voice information. The difficulty in addressing this need is compounded with the use of such equipment in mobile applications, such as those related to land-mobile vehicles, aeronautical and maritime. While reliable communication under such conditions is desirable for commercial or private purposes, there is a clear need for highly reliable communications related to military and law enforcement applications worldwide, and even those involving governmental functions, such as those related to the diplomatic efforts of personnel in embassies or other stations around the world.

Communication via two-way voice pagers, HF-VHF packet radio and the increasingly popular handsets would benefit from an improved voice communication technology. The need for such advance is particularly apparent for wireless mobile or satellite mobile channels. For mobile satellite channels, the quality of voice will depend on the type of channel that is used, for example, land mobile, maritime, or aeronautical. Among these channel types, the land mobile/satellite link is the most diversified since it can be established in environments having widely varying operational parameters.

On a land-mobile satellite link, the received signal level changes rapidly because of multipath fading. The signal level is also attenuated by shadowing due to the transmission link obstacles such as buildings, trees, foliage, and environment terrain. In the traditional full duplex links, fading in the forward link (in the direction of base station to the mobile) is independent of fading in the reverse link because separations between frequency bands in the forward channel and the reverse channel is more than the coherence bandwidth of the channel.

Conventionally, for a fixed channel symbol rate, the transmission voice quality can be improved by dynamically adapting the system parameters to the channel state conditions by varying one or a combination of the following parameters:

Voice codec bit rate

Transmit power level

Error control redundancy rate

Modulation signal space

The variation of such conditions typically occurs through the use of a separate signaling channel, which must provide fast and reliable communication of control information between the transmitter and the receiver. The signaling channel may be in-band or out-of-band, and may involve an open loop communication (one-way without feedback as to the success or accuracy of a transmission) or a closed loop communication (two way with feedback).

"Gear Shifting" is a well known method to improve the voice quality over dynamically changing mobile channels where, for a given received C/N, voice quality (or voice codec bit rate) is traded off against the available $E_b/N_0$. The receiver and the transmitter "sense" the channel state and switch the transmitted bit rate to a lower or a higher rate according to variations in the link conditions. Switching from one state to another state is usually performed upon mutual agreement between the transmitter and the receiver through messages exchanged over this signaling channel.

A major drawback of the gear shifting technique and other well known adaptive voice transmission schemes is their dependency on the existence of a fast and reliable signaling channel, in-band or out-of-band. In a terrestrial network, where propagation delay is small, the closed loop signaling technique may be acceptable. However, when the communication link includes a satellite, the 540 ms delay encountered during the round trip over geostationary satellite links is considerably larger than the coherence bandwidth of the channel. For low earth orbiting satellites and intermediate circular orbiting satellites, the propagation delays are 20 ms and 132 Ms, respectively, which are again significantly larger than the fading frequency. The reliability of the signaling channel cannot be guaranteed under all channel conditions since the signaling channel might also be unreliable when the transmission link is in a deep fade or shadow.

Power control, involving control over transmit power level, is another technique for improving the voice quality over a dynamically changing channel environment. However, its effectiveness is limited by the satellite or base station EIRP in the forward direction, and the hand held battery power in the return direction. Moreover, a high powered transmitter causes extra interference to adjacent channels. Therefore, power control in conjunction with other adaptive techniques, based on tradeoffs among other system parameters, should out perform a system design which only uses power control. Existing approaches also employ a voice coder that operates at a fixed voice coding rate, and use prioritized channel protection.

Error control may be used for improving the quality by increasing the rate of redundancy for the transmitted signal. However, this technique requires adaptively changing the amount of redundant data which is being transmitted. This approach requires constant monitoring and feedback of the channel condition for purposes of varying the redundancy rate.

High level modulation schemes, i.e., trellis coded 8PSK modulation have been extensively analyzed for mobile applications. However, high level modulations are more sensitive to phase noise and other mobile channel impairments and require a larger link C/N for achieving a high bandwidth efficiency.

Even when transmission parameters are appropriately managed in order to improve voice quality, voice codecs may be selected to further enhance system performance. As an alternative to the conventional fixed rate voice codec, variable rate codecs using multi-mode coding have been used. In multi-mode coding, different voice coding algorithms and/or techniques are used for each of several different bit rates.

Where multi-mode coding was used, a different voice coder is employed for each rate. With this approach, each rate can have optimal voice quality, but higher hardware complexity is required. Further, switching between rates can introduce discontinuities. In addition, the multi-mode coding technique is sensitive to proper mode detection and control errors can result from degraded channels. The dependence upon a feedback or "reverse" channel control of the transmitted bit rate offers a further disadvantage.

Accordingly, it is an object of the present invention to provide a nested voice codec which transmits voice information at the highest bit rate and at the receive side a decoder that derives lower rate signals for lower quality voice communication.

It is a further object to provide a nested coding approach which permits the reduction of transmitted bit rate at any point in the transmission path.

It is yet another object of the present invention to provide a channel coding technique which is compatible with digital voice signals generated by a nested voice codec.

It is a further object of the present invention to provide a combination of channel decoder and nested voice decoder which operates to derive from a transmitted signal an intelligible voice communication.

It is an object of the present invention to provide a voice communication system which combines low rate speech coding with advanced channel and modulation techniques.

It is a further object of the invention to provide a voice communication system which provides automatic rate reduction under degraded conditions but without transmit side control and with high efficiency.

It is a further object of the invention to provide gradual speech degradation which retains connectivity under degraded transmission conditions.

It is yet another object of the present invention to provide a voice communication system, including a transmitter having a nested voice codec and compatible channel coding, in combination with a receiver having a nested voice decoder in combination with a channel decoding system.

It also is an object of the present invention to provide a receiver having a channel state estimator which selectively controls the voice decoder on the basis of detected channel parameters including carrier power, unique word correlator, bit error rate estimator and decoded bit reliability.

SUMMARY OF THE INVENTION

The present invention is adapted to achieve the foregoing objects. In accomplishing these objects, the present invention combines an embedded codec and a modem using forward error correction in a manner which overcomes the deficiencies of the prior art. The invention is based upon a nested voice codec, which is capable of operating at three rates in a nested manner. In conjunction with a multi-level, prioritized channel coding scheme, the corresponding voice decoder can adopt to varying channel conditions, so that an intelligible voice link can be maintained even under poor channel conditions. The encoder always encodes the voice at the highest rate, but in such a manner that the decoder can reconstruct the speech not only using the full rate, but also using subsets of the transmitted bit rates. The transmitted bits are prioritized into different levels and different degrees of error robustness are provided to different levels, depending on the importance of the bits. At the receiver, when the channel conditions are good, the decoder uses the full rate resulting in high quality voice. If the channel conditions degrade, this is detected by the channel state estimator and the voice decoder uses the more reliable subset of bits so that reconstruction at lower rates occurs.

BRIEF DESCRIPTION OF THE DRAWINGS

FIG. 5A is an illustration of the technique for excitation coding at a subrate of the maximum rate in accordance with the present invention.

FIG. 6A is an illustration of the channel encoder block diagram and modulation mapping.

FIG. 6B is an illustration of applicable Gray modulation mapping rules.

FIG. 6C is an illustration of applicable binary modulation mapping rules.

DESCRIPTION OF THE PREFERRED EMBODIMENTS

The present invention combines a nested voice codec with compatible channel coding and modulation, for use in a variety of environments, but with particular application to satellite/mobile communication systems due to the wide variety of problems that must be solved.

In the nested coding procedure, a codec will operate at a maximum rate which supports additional subrates in a nested or embedded manner. In the nested coding procedure, a single algorithm generates the highest bit rate digital voice from which the lower rates can be derived by dropping specific bits. Using the nested coding approach, rate reduction may be achieved at any point in a transmission path. The concept of the nested codec is to adapt the voice bit rate, as delivered to the user and not necessarily always as generated at the transmit side, to channel conditions so that, on the average, the voice quality is substantially better than a fixed system. The nested codec is distinguishable from techniques which require signaling messages for switching from a good state to a bad state and vice versa. The elimination of a separate signaling channel, either in-band or out-of-band, is a significant advantage of the nested codec.

Figure 1A:
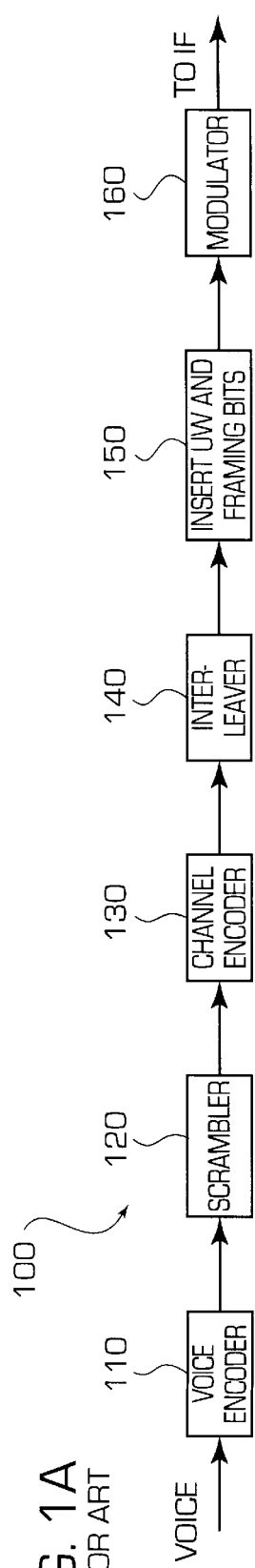
FIG. 1A is an illustration of a transmitter block diagram for a conventional voice communication system.

As seen in FIG. 1A, in the conventional transmitter 100, voice signals are coded by voice encoder 110 and the encoded signal scrambled in a scrambler 120 and processed by channel encoder 130 prior to presentation of the sequence to an interleaver 140, unique word (UW) and framing bit insertion 150 and modulator 160. The resulting encoded and assembled signal is provided to an IF section for transmission.

Figure 1B:
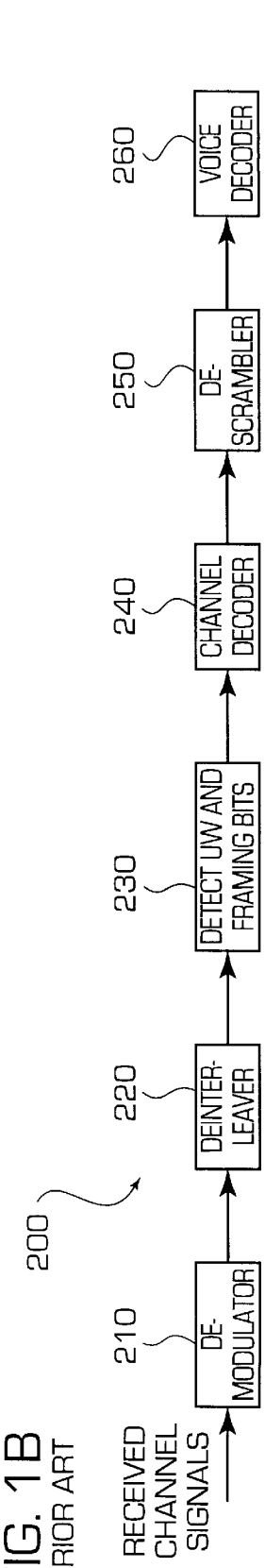
FIG. 1B is a conventional receiver block diagram in a voice communication system.

On the receiver 200 side, as seen in FIG. 1B, the channel symbols are first demodulated by a demodulator 210, deinterleaved at module 220, the UW and framing bits detected at module 230, the channel decoded at channel decoder 240, descrambled at 250 and voice decoded at unit 260 to provide a transmitted voice output.

Figure 2:
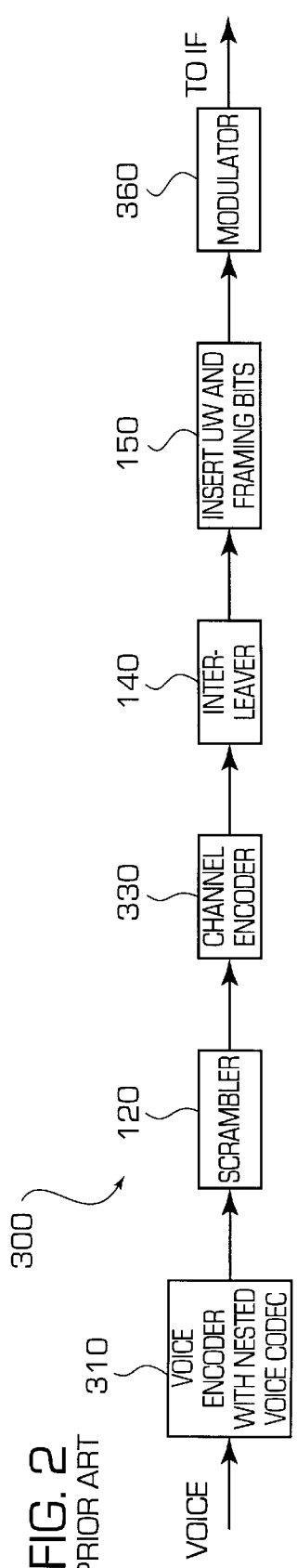
FIG. 2 is an illustration of a transmitter block diagram which incorporates the channel encoder and voice encoder of the present invention.

In the transmitter 300 system which embodies the nested voice codec and channel encoder techniques, as seen in FIG. 2, the voice encoder has been replaced by the nested voice encoder 310 and the channel encoder has been replaced by the compatible channel encoder 330. The remaining elements of the transmitter are conventional, including the scrambler 120, interleaver 140, UW and framing bit module 150. The modulator 360 also may be selected in accordance with particular modulation mapping rules that are compatible with the output provided by the channel encoder 330.

In a preferred embodiment of the invention, the transmitter 300 is particularly applicable to mobile satellite communications where robust operation over power limited communication channels is required, such as the Inmarsat-P and similar personal communication systems. In that environment, the nested voice encoder 310 will transmit at a constant data rate of 3600 bit/s and will utilize subrates which are an integral subset of the full data rate, specifically 2400 bit/s and 1200 bit/s. Due to its nested design, the lower rate information handled by encoder 310 can be obtained as a subset of the higher rate information. However, the voice encoder 310 always encodes the voice signal at an information bit rate of 3600 bit/s. This encoding technique permits a decoder to reconstruct the voice signal from the full rate of 3600 bit/s or the two subrates of 1200 bit/s or 2400 bit/s, which are obtained in subsets of the full rate. This results in three possible modes of operation for the decoder. It may use the full bit rate of 3600 bit/s to produce high quality voice, with a high degree of naturalness and intelligibility. Under slightly degraded conditions, the smaller sub bit rate of 2400 bit/s, which is an integral subset of the full bit rate, may be used to provide a slightly reduced quality voice, with a moderate degree of naturalness and a high degree of intelligibility. Under extreme conditions, using a still smaller sub bit rate of 1200 bit/s, which is a smallest subset of the full bit rate, voice may be reconstructed with a reduced level of naturalness but with a high degree of intelligibility. Clearly, the bits forming the two sub-bit rates are subsets of the full bit rate of 3600 bit/s and are not additionally transmitted.

The concept of the nested codec/modem is based upon the transmission of voice always at its maximum bit rate. Individual bits in a voice frame are protected by a channel code according to their importance. Sufficient redundancy is allocated to the most important bits to assure their high transmission reliability even under severe channel conditions. Little or no redundancy is allocated to less important bits for error protection purposes. At the receive side, the channel state condition is estimated and the voice decoder adaptively delivers voice to the user the maximum and lower rates, so that, on the average, the perceived voice quality is substantially better than a fixed system.

The voice encoder 310 will combine a 1200 bit/s voice codec that is based on split LSF vector quantization and both a 2400 bit/s voice codec and a 3600 bit/s voice codec that, in addition to split LSF vector quantization, are based on time-frequency interpolative coding of excitation signals. However, since most of the time the decoder is expected to operate in the 3600 bit/s mode, the voice encoder 310 will be optimized primarily for that rate.

In order to provide an acceptable level of operation at 1200 bit/s and 2400 bit/s, it is necessary to transmit certain basic parameters such as pitch, voicing, gain and spectral parameters (and some excitation spectral information at 2400 bit/s). With these considerations, one of the possible sets of the parameters selected for the codec are shown in Table 1. In the foregoing operation, an 8 kHz sampling rate is assumed.

TABLE 1

| Voice Codec Frame Size | 25 msec |
|---|---|
| Voice Codec Frame rate | 40 frames/sec |
| Number of Bits/Frame (before FEC): | |
| for 3600 bit/s decoding: | 90 bits |
| for 2400 bit/s decoding: | 60 bits |
| for 1200 bit/s decoding: | 30 bits |

Based on the example of the framing parameters shown in Table 1, the bit-allocation selected for encoding the various voice coding parameters in each of the three decoding modes is shown in Table 2.

TABLE 2

| | 1200 bit/s Mode | | 2400 bit/s Mode | | 3600 bit/s Mode | |
|---|---|---|---|---|---|---|
| | voiced | un-voiced | voiced | unvoiced | voiced | unvoiced |
| Voicing | 1 | 1 | 1 | 1 | 1 | 1 |
| Pitch | 5 | 0 | 5 | 0 | 5 | 0 |
| Gain | 4 | 5 | 4 | 5 | 4 | 5 |
| LSFs | 20 | 20 | 20 | 20 | 20 | 20 |
| Excitation | 0 | 4 | 30 | 34 | 60 | 64 |
| Total bits | 30 | 30 | 60 | 60 | 90 | 90 |

The various parameters are encoded in accordance with principles applicable to the three differing rates.

Voicing and pitch analysis is performed by a neural network based voicing classification and pitch estimation algorithm applicable to a 1200 bit/s voice codec. This algorithm makes it necessary for the encoder to operate at a delay of at least 1 voice frame. This delay arises since the voicing and pitch of the frame is decided based on a raw voicing and pitch estimates of the next frame.

Voicing is encoded using a single bit. If the frame is found to be voiced, a single pitch value is encoded using 5 bits. For the first voiced frame after an unvoiced frame, the pitch value is coded absolutely (i.e., without differential encoding) using a coarse 5 bit quantizer. The quantization characteristic for absolute encoding of pitch period is specified in Table 3.

TABLE 3

| Level # | Absolute Pitch | Quantized Absolute Pitch | Level # | Absolute Pitch | Quantized Absolute Pitch |
|---|---|---|---|---|---|
| 0 | 16–20 | 18 | 16 | 66,67,68 | 67 |
| 1 | 21,22,23 | 22 | 17 | 69–73 | 71 |
| 2 | 24,25,26 | 25 | 18 | 74–78 | 76 |
| 3 | 27,28,29 | 28 | 19 | 79–83 | 81 |
| 4 | 30,31,32 | 31 | 20 | 84–88 | 86 |
| 5 | 33,34,35 | 34 | 21 | 89–93 | 91 |
| 6 | 36,37,38 | 37 | 22 | 94–98 | 96 |
| 7 | 39,40,41 | 40 | 23 | 99–103 | 101 |
| 8 | 42,43,44 | 43 | 24 | 104–108 | 106 |
| 9 | 45,46,47 | 46 | 25 | 109–113 | 111 |
| 10 | 48,49,50 | 49 | 26 | 114–118 | 116 |
| 11 | 51,52,53 | 52 | 27 | 119–123 | 121 |
| 12 | 54,55,56 | 55 | 28 | 124–128 | 126 |

TABLE 3-continued

| Level # | Absolute Pitch | Quantized Absolute Pitch | Level # | Absolute Pitch | Quantized Absolute Pitch |
|---|---|---|---|---|---|
| 13 | 57,58,59 | 58 | 29 | 129–133 | 131 |
| 14 | 60,61,62 | 61 | 30 | 134–138 | 136 |
| 15 | 63,64,65 | 64 | 31 | 139–143 | 141 |

After the first voiced frame, for each succeeding voiced frame until an unvoiced frame is encountered, pitch is quantized differentially. The difference between the pitch period of the present voiced frame and the quantized pitch period of the previous voiced frame is quantized using a 5 bit quantizer. The quantization characteristic for differential pitch quantization is shown in Table 4.

TABLE 4

| Level # | Difference Pitch | Quantized Difference Pitch | Level # | Difference Pitch | Quantized Difference Pitch |
|---|---|---|---|---|---|
| 0 | 0 | 0 | 16 | −5 | −5 |
| 1 | 1 | 1 | 17 | −6 | −6 |
| 2 | 2 | 2 | 18 | −7 | −7 |
| 3 | 3 | 3 | 19 | −8 | −8 |
| 4 | 4 | 4 | 20 | −9 | −9 |
| 5 | 5 | 5 | 21 | −10 | −10 |
| 6 | 6 | 6 | 22 | −11 | −11 |
| 7 | 7 | 7 | 23 | −12 | −12 |
| 8 | 8 | 8 | 24 | −13, −14, −15 | −14 |
| 9 | 9 | 9 | 25 | −16, −17, −18 | −17 |
| 10 | 10 | 10 | 26 | −19, −20, −21 | −20 |
| 11 | 11 | 11 | 27 | −22, −23, −24 | −23 |
| 12 | −1 | −1 | 28 | 12, 13, 14 | 13 |
| 13 | −2 | −2 | 29 | 15, 16, 17 | 16 |
| 14 | −3 | −3 | 30 | 18, 19, 20 | 19 |
| 15 | −4 | −4 | 31 | 21, 22, 23 | 22 |

With respect to line spectral frequency parameters, the input signal is analyzed using a $10^{th}$ order covariance-lattice LPC analysis, and the resulting LPC parameters are converted to LSF parameters. The vector of 10 LSF parameters are split into two subvectors of dimensions 4 (LSFs 1–4) and 6 (LSFs 5–10). Each subvector is quantized using a 10 bit vector quantizer. The vector quantizer may be trained on a speech data base using the Linde-Buzo-Gray algorithm. A spectrally weighted distortion measure is used to locate the optimal code vector. A total of 20 bits may be used to encode the LSF parameters. After vector quantization, the input signal is prediction filtered using the quantized LSF parameters. The resulting signal is called the residual signal. For the given quantization parameters, during unvoiced frames, the power level of the residual signal is encoded absolutely, using 5 bits. During voiced frames, the gain is encoded differentially, using 4 bits. In the case of absolute quantization, the gain is estimated as the root-mean square value of the signal, converted to logarithmic form, and quantized linearly using 32 levels. In the case of differential quantization, the ratio between the absolute gain of the present frame and the quantized gain of the previous frame is converted to logarithmic form and quantized using 16 levels.

The absolute quantization of the gain during unvoiced frames, as well as the absolute quantization pitch during the first voiced frame serves to prevent the propagation of the effect of errors beyond a voiced speech spurt. In addition, the absolute quantization reinitializes the starting point for differential quantization, which has the effect of faster adaptation to local characteristics.

Figure 3A:
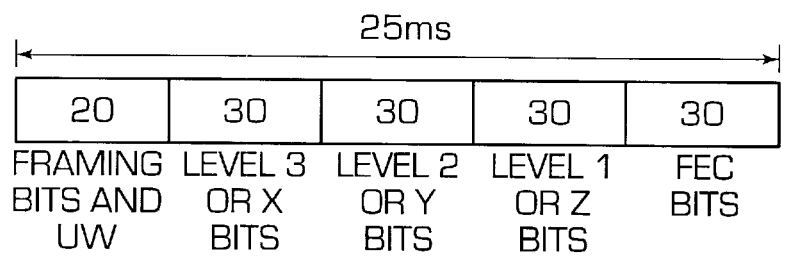
FIG. 3A is an illustration of a voice frame structure for a preferred embodiment of the present invention.

The nesting mode of operation depends upon a channel coding technique which uses a selective, multi-level error detection and correction scheme, based on a classification of information bits into three sensitivity levels. An illustration of a 25 ms voice frame for the preferred embodiment is seen in FIG. 3A, and comprises 20 overhead bits for framing and unique word, 30 FEC bits and 90 information bits absorbed into three levels. The most sensitive (level 3) bits correspond to the most essential "core" information, which is encoded into a bit rate of 1200 bit/s. These receive the highest level of error detection and correction capability. These bits are "most critical" since these carry information needed to reproduce certain basic characteristics of the voice signal such as voicing, pitch frequency, power level and format frequencies. With these characteristics, it is possible to reconstruct voice that is highly intelligible and has a good degree of speaker recognizability. However, these characteristics are not adequate to produce natural sounding speech.

Level 2 bits are encodings of certain characteristics of the voice signals that are necessary to introduce a moderate level of naturalness in the reconstructed speech. Examples of such characteristics are excitation spectral characteristics. These characteristics are encoded using a bit rate of 1200 bit/s, so that along with level 3 bits, moderately natural sounding voice can be produced at a total bit rate of 2400 bit/s. Level 2 bits receive a moderate amount of error detection and correction capability. Consequently, these are received accurately even in the presence of some degree of channel degradation.

Level 1 bits contain more information about the excitation which contributes to a further improvement in voice quality. Level 1 bits, also transmitted at a rate of 1200 bit/s, have a low level of error protection. These bits are received correctly when the channel is operating under nominal conditions. In this case, all three levels of bits can be used at a total rate of 3600 bit/s, resulting in a highly natural sounding speech.

Figure 3B:
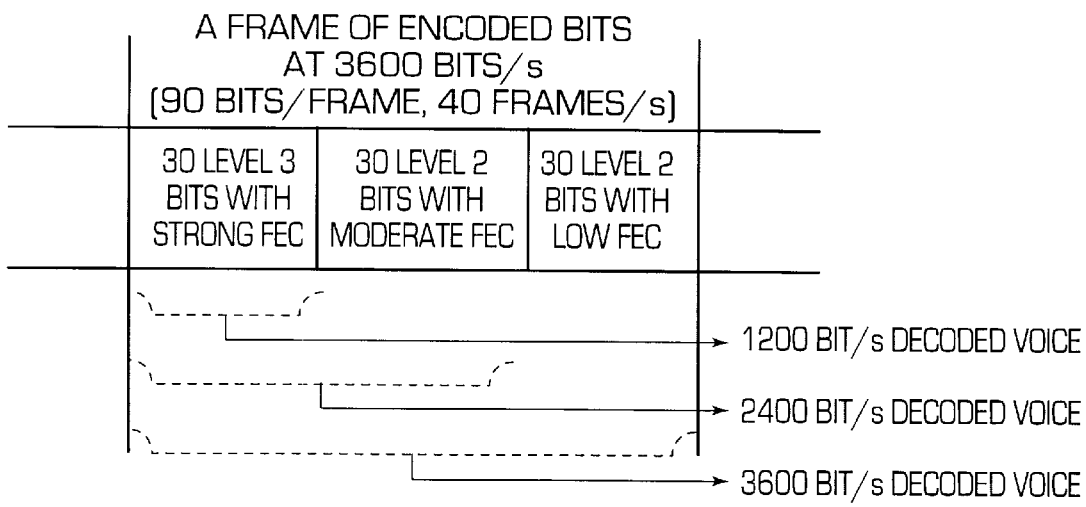
FIG. 3B shows the distribution of bits with error coding.

For the foregoing embodiment, the basic combination of FEC and decoded bits is seen in FIG. 3B. The transmitted bit rate of the system, after voice coding and channel coding, will be increased due to framing and synchronization.

Figure 4:
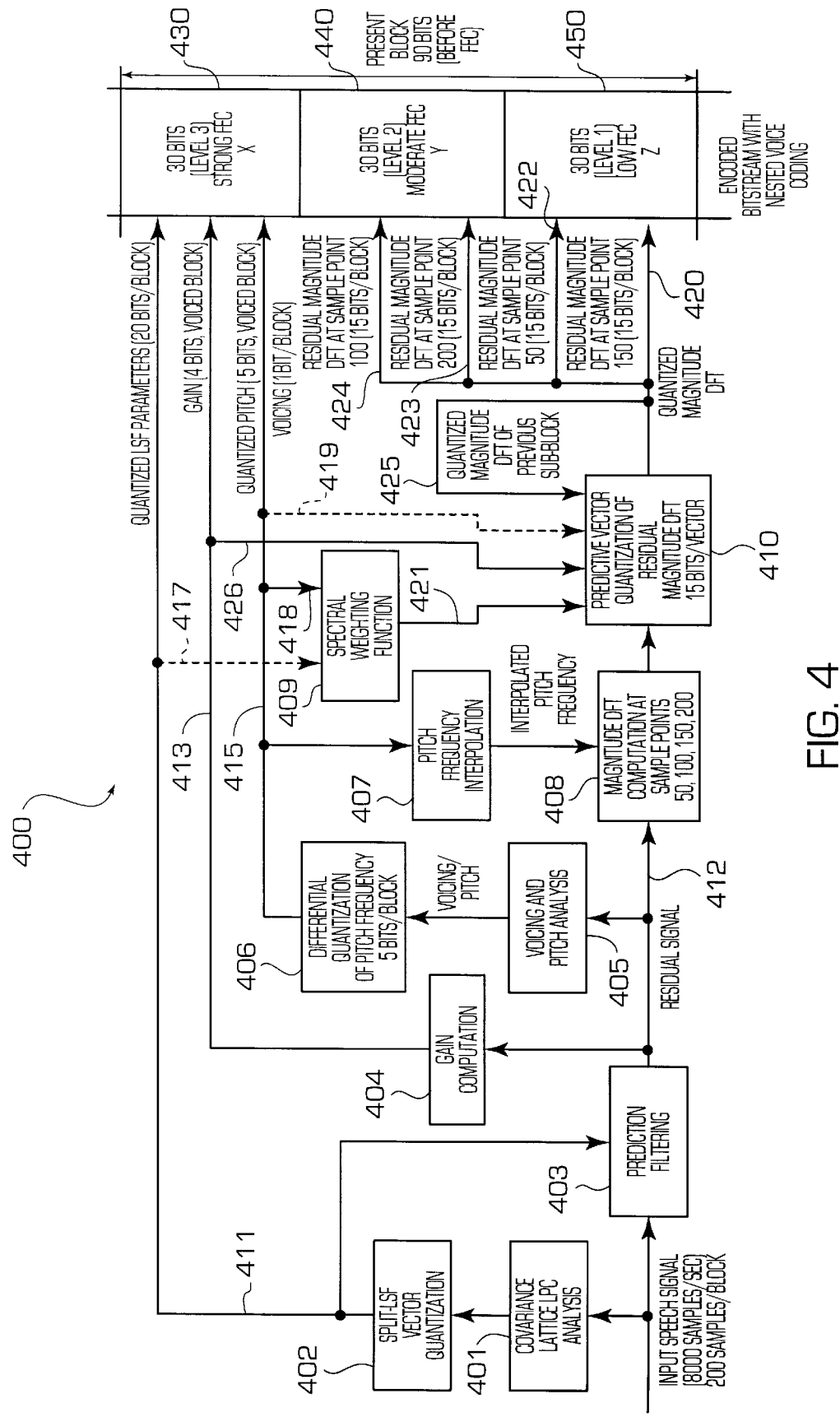
FIG. 4 is a detailed block diagram of the encoder for a nested voice codec in accordance with the present invention.

A block diagram of the encoder for the nested voice codec, which is operable with a channel encoding technique as disclosed, is seen in FIG. 4. An input speech signal is sampled at the conventional rate of 8,000 samples per second, providing 200 samples per block. That input is provided to a covariance-lattice LPC analysis unit 401 which in turn provides split LSF vector quantization in unit 402. Unit 401 alternatively may use auto correlation to achieve a tenth order analysis of the relevant parameters. The result of that processing is provided via line 411 as quantized LSF parameters represented by 20 bits per block. The input speech signal is also provided to prediction filter 403, which additionally receives the output of the split LSF vector quantization algorithm in unit 402 via line 411. The prediction filter 403 generates a residual signal on line 412 which is provided to a unit 408 for computing the magnitude of the DFT. This computation is conducted in accordance with the illustration of FIG. 5A, as subsequently described, representing excitation coding for a 3600 bit/s mode. The residual signal is further applied to voice and pitch analysis unit 405 and the results of that analysis are provided to a differential quantizer 406 which provides a pitch frequency representation of 5 bits per block. The output of quantizer 406 is provided on line 415 as quantized pitch represented by 5 bits per voice block and a voicing signal represented by 1 bit per block. The output of the gain computation unit 404 is a signal representing gain by 4 bits per voice block and appearing on line 413. The quantized LSF parameters, gain and quantized pitch and voicing parameters represent the basic parameters required to reproduce speech which is intelligible. Thirty bits are required, as represented by block 430. However, strong forward error correction is necessary to ensure the accurate transmission of this information. The quantized pitch signal on line 415 is further provided to pitch frequency interpolator 407, whose output on line 416 is provided to the DFT magnitude computing unit 408 for purposes of the computation represented in FIG. 5A. The output of unit 408 is provided to a predictive vector quantizer for the residual magnitude DFT, operating at 15 bits per vector. Quantizer 410 is responsive to additional functions in producing a quantized magnitude DFT on line 420. In particular, the quantized LSF parameters optionally may be provided via line 417 (dotted line) to a spectral weighing function 409 which also receives a quantized pitch signal and voicing signal via lines 415 and 418. The spectral weighing function 409 is optional as indicated by the dotted line, and provides a first input to the residual quantizer 410 via line 421; otherwise line 419 is to be used. The computed gain (4 bits per voice block) via line 426 and a signal from DFT Computation 408 are also provided to the residual vector quantizer 410. Finally, feedback of the quantized magnitude DFT of a previous subblock on line 425 is also provided to affect the predictive function of quantizer 410 via line 420. The output on line 420 from the residual quantizer may be used to effect the first and second levels of transmitted information. The second level of 30 bits in the 90 bit frame is represented by a residual magnitude DFT at sample point 100, comprising 15 bits per block. In addition, a residual magnitude DFT at sample point 200 is further provided and is represented by 15 bits per block, totaling 30 bits for the second level. The first level is defined by residual magnitude DFT at sample point 50, provided on line 422 to the block 450 together with a residual magnitude DFT at sample point 150 represented by 15 bits per block and provided to unit 450 on line 420. The block of 90 bits is provided to the channel coder for forward error correction.

For 1200 bit/s reconstruction, the decoder uses the voicing, pitch, gain and LSF parameters, along with a binary excitation signal to construct the voice signal. For reconstruction at 2400 bit/s and 3600 bit/s rates, certain characteristics of the residual signal are encoded and transmitted, and these are used to construct an excitation signal at the decoder. During voiced frames, the residual signal is encoded using a time-frequency interpolative method. In this method, the spectral characteristics of the excitation signal are modeled as evolving gradually over the duration of the frame, rather than by abrupt changes at the end of each frame. The pitch frequency, which is transmitted once per frame using 5 bits as described earlier, is linearly interpolated across the frame, resulting in an instantaneous pitch frequency corresponding to each sample-instant in the frame. This linear interpolation uses the values of the pitch frequency of the past, present and the next frames.

The residual is encoded by encoding the magnitude of the short term discrete fourier transform (M-STFT) evaluated at the pitch frequency and its multiples. The M-STFT of the residual is evaluated at fixed intervals within the frame. For 2400 bit/s, the M-STFT is evaluated at 100 samples and 200 samples (i.e, at the mid- and end-points of the frame). For 3600 bit/s, the M-STFT is evaluated at 50 samples, 100 samples, 150 samples and 200 samples (i.e., at the quarter-, mid-, three quarter- and end-points of the frame). Note that mid- and end-points are common to both these modes. Essentially, for 3600 bit/s encoding the M-STFT encoding at one quarter- and three quarter-points are added to the encoded mid- and end-point M-STFT obtained from the 2400 bit/s mode. Thus, the excitation encoding for the 2400 bit/s can be viewed as being nested within the excitation encoding for the 3600 bit/s mode. This approach is illustrated in FIGS. 5A and 5B, and it should be noted that the M-STFT at mid- and end-points are identical to both 2400 bit/s and 3600 bit/s modes.

Figure 5B:
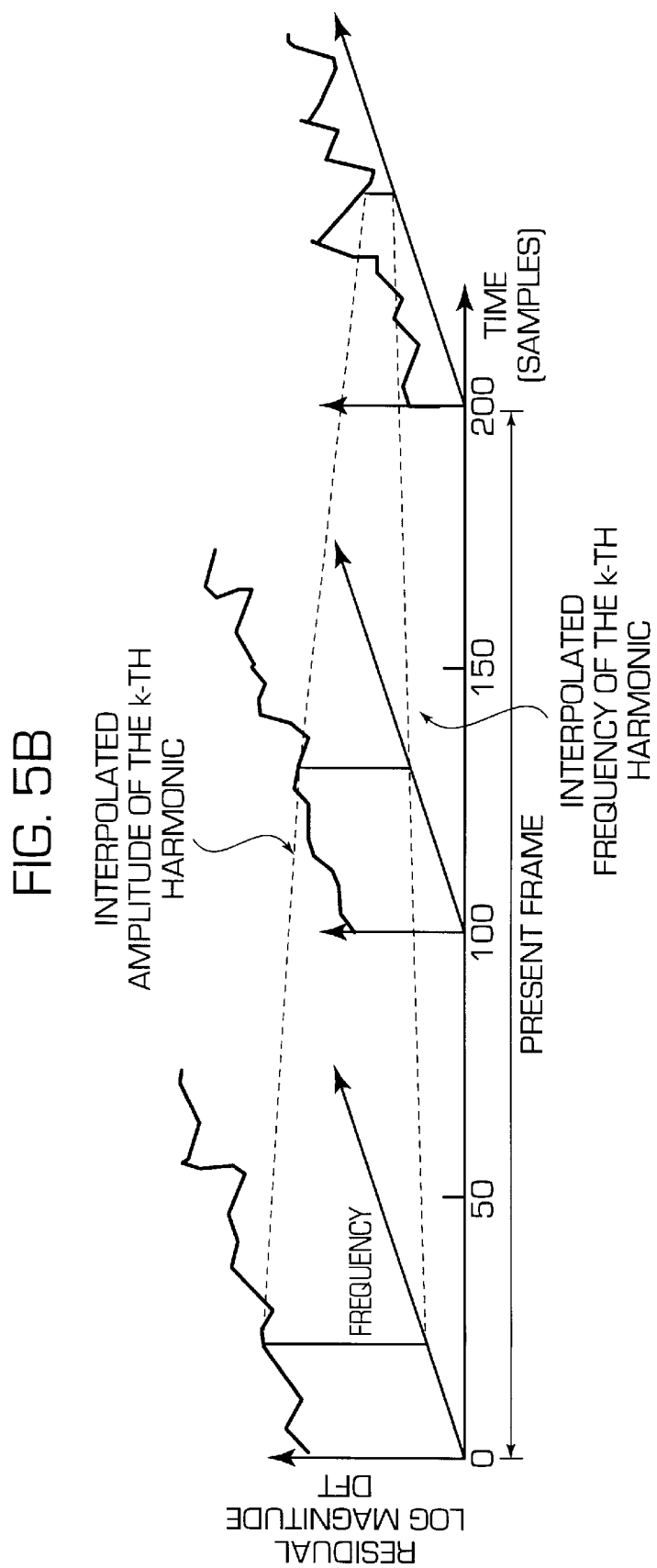
FIG. 5B is an illustration of the excitation coding for the maximum rate in accordance with the present invention.

FIGS. 5A and 5B also show that the amplitudes of individual harmonics are interpolated across the frame based on the "anchor points" provided by the encoded M-STFT. In the case of the 2400 bit/s mode, these anchor points are provided at the mid- and end-points of the frame. In the case of the 3600 bit/s mode, these anchor points are provided at quarter, mid- three quarter- and end-points. The anchor points at mid- and end-points are identical for the two modes. Since 3600 bit/s has two extra anchor points it can provide a better approximation to the evolution of the actual harmonic amplitude, leading to better speech quality. Also note that regardless of which mode the present frame was decoded in, the next frame has the same starting point for interpolation, as the end-point is common to both 2400 bit/s and 3600 bit/s modes.

The M-STFT is encoded using a predictive vector quantization approach. If the instantaneous pitch period in samples is P(n), the M-STFT has a total of $$\left\lfloor 1 + \frac{P(n)}{2} \right\rfloor$$

components, where $\lfloor \, \rfloor$, indicates truncation to the nearest smaller integer. Each of these M-STFT is vector quantized using a predictive gain-shape vector quantizer, at 15 bits per vector (9 bits shape and 6 bits gain). A random codebook or a trained codebook may be used.

The multi-rate capability of the nested voice coder, in conjunction with the multi-level channel coding, allows the receiver to adapt to varying channel conditions. For the preferred embodiment, the foregoing voice codec parameters would be relevant to the selection of channel coding type. As previously noted, each voice frame consists of 90 bits or 25 ms. According to their importance, the 90 bits in each frame are grouped into three equal segments of 30 bits. The first 30 bits are the most important bits (Level 3). These bits represent gain and pitch and other important voice parameters, and are denoted by $X=(x_1, x_2, \ldots, x_{30})$. The X bits must be received with a high integrity, i.e., low error rate, otherwise, the voice frame does not convey any intelligible information. The second segment of 30 bits have a Level 2 priority, can tolerate a moderate bit error rate and are denoted by $Y=(y_1, y_2, \ldots, y_{30})$. The last segment of 30 bits, Level 1 bits, are denoted by $Z=(z_1, z_2, \ldots, z_{30})$, and do not require a very low BER at the receive side.

For a 90 bit voice frame consisting of 30 bit segments X, Y, and Z, The first segment $X=(x_1, x_2, x_3, \ldots, x_{30})$ is encoded by a convolutional code of rate ½. The first encoder output constitutes a block of 30 bits, $X_1=(x_{11}, x_{12}, x_{13}, \ldots, x_{1,30})$, and are stored in the first row and in columns 1 though 30 of a two-row by 60-column array as shown in FIG. 6A. The second encoder output constitutes another block of 30 bits, $X_2=(x_{21}, x_{22}, x_{23}, \ldots, x_{2,30})$ and are stored in the first row of the array in columns 31 through 60. The order in which these blocks are stored in the array of FIG. 6A is for illustration purposes. In a hardware or software implementation, the order can be modified for minimizing the processing delay. Next, the 30 Y bits, $Y=(y1, y2, y3, \ldots, y30)$, are stored in the second row of the array in columns 1 through 30 and the 30 Z bits, $Z=(z1, z2, z3, \ldots, z30)$, are stored in the second row of the array in columns 31 through 60.

After the array is filled up, each pair of bits in columns 60 through 31 are mapped into one of the QPSK signal points using the Gray mapping rule shown in FIG. 6B. Finally, columns 30 through 1 of the array are mapped into the QPSK signal points using the straight binary mapping rule shown in FIG. 6C. An unequal error protection coding scheme, used in conjunction with a binary modulation format (e.g., BPSK) or a quaternary modulation techniques such as QPSK, offset-QPSK, MSK, Gaussian MSK, or π/4-QPSK, would be compatible with the proposed nested voice codec-based system. In a binary modulation the quadrature components, shown in the mapping rules of FIG. 6B, are transmitted by antipodal points. When applicable, differential encoding can be employed as well for phase ambiguity resolution. Therefore, a variety of modulation techniques may be used with the nested codec system.

Specifically, constant envelope 2 bit/symbol or 1 bit/symbol modulation schemes are preferred for satellite communications applications.

Both block codes and convolutional codes with soft decision decoding are applicable to the present invention. Convolutional codes are preferred because of their larger coding gain and flexibility for generation of different code rates.

Figure 8:
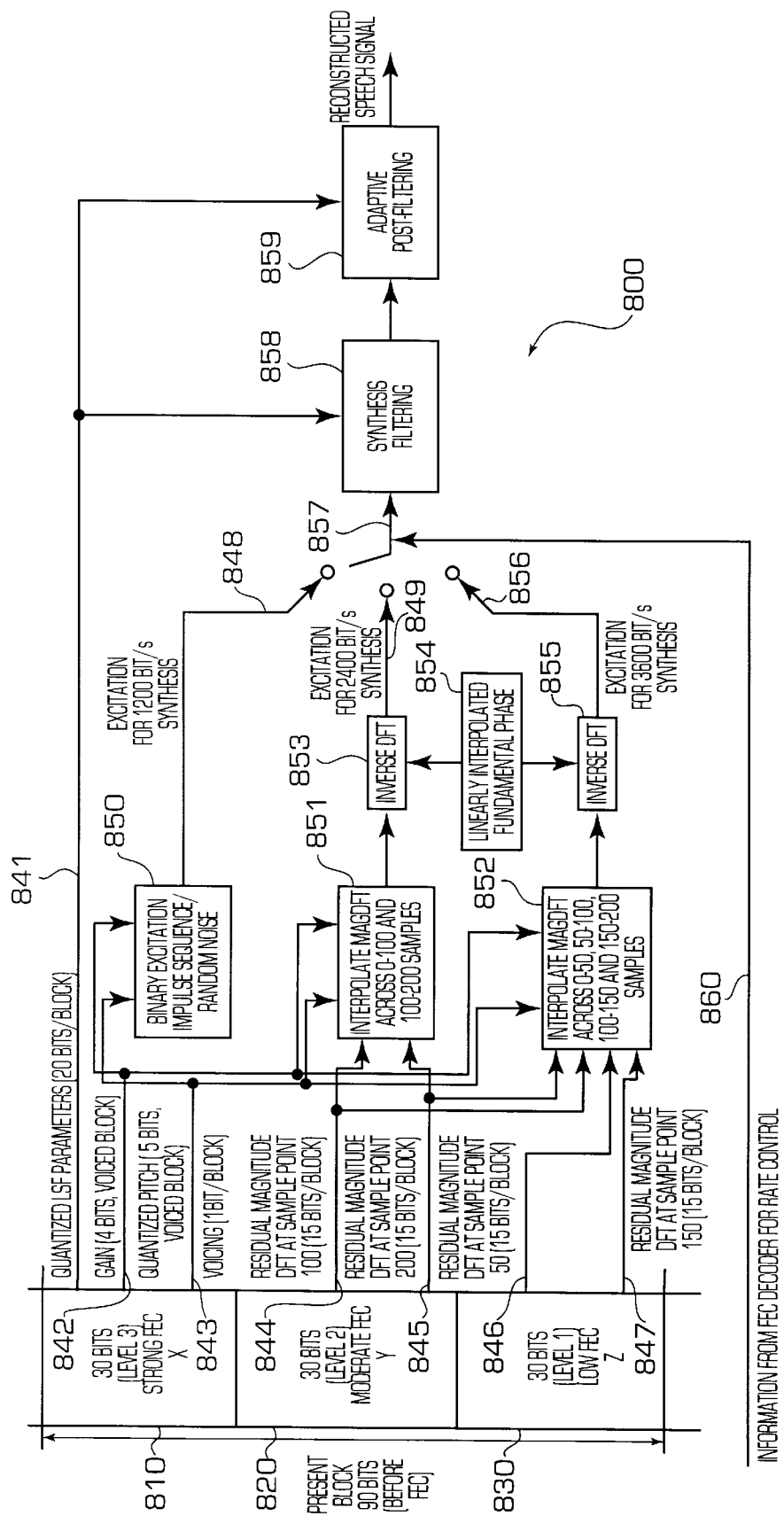
FIG. 8 is a block diagram of the decoder for the nested voice codec.

At the voice decoder, the residual is reconstructed by using the interpolated harmonic magnitudes obtained from a interpolation of the quantized magnitude DFTs. These interpolated magnitudes at each sample are combined with the interpolated harmonic frequencies at that sample and a linear phase evolution of fundamental phase to synthesize the residual signal. The resulting residual is passed through the short term synthesis filter to obtain the reconstructed speech signal. The block diagram of the voice decoder (for the case of voiced frames) is depicted in FIG. 8, discussed subsequently.

Figure 7:
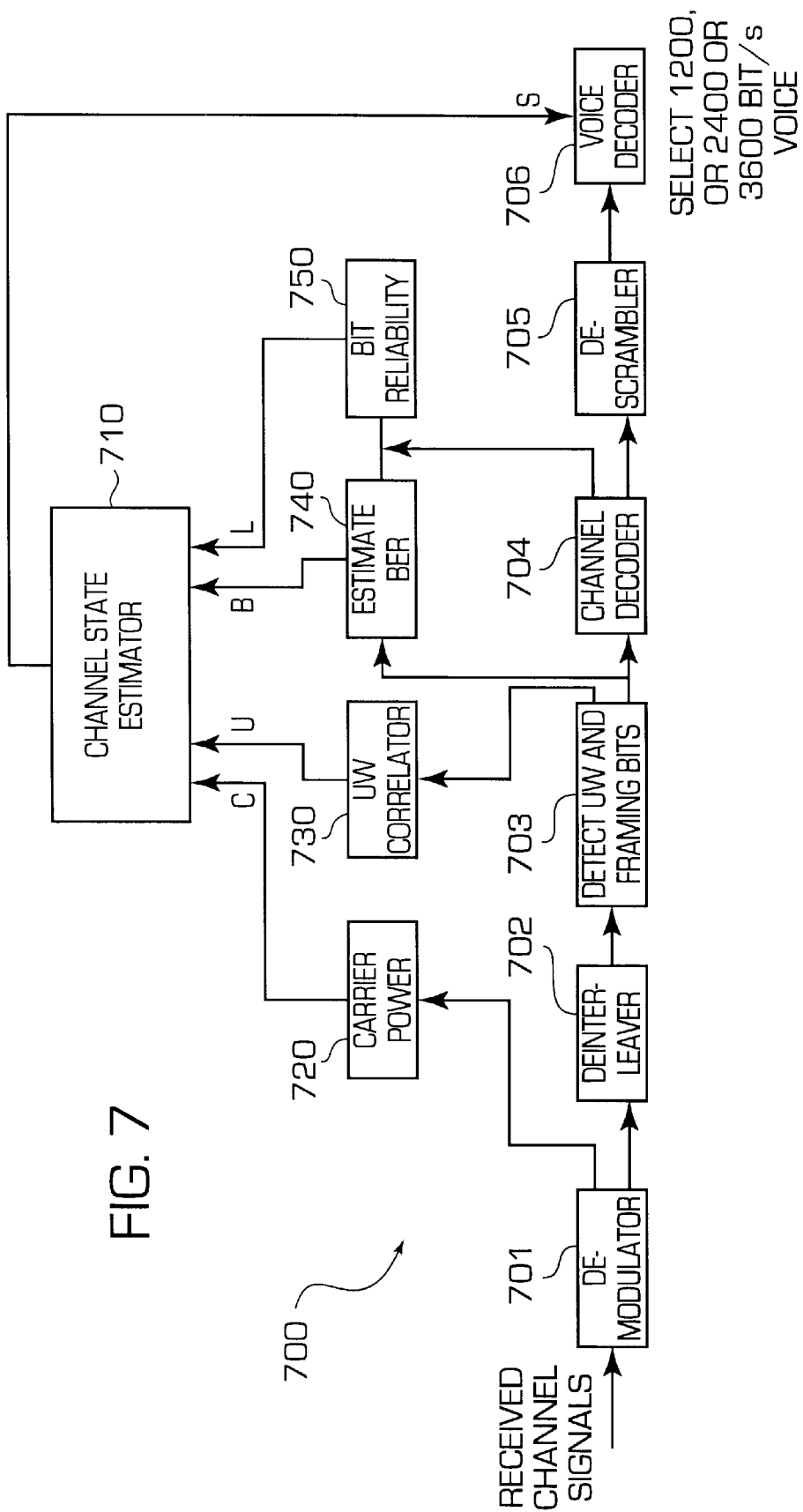
FIG. 7 is an illustration of the receiver block diagram having a channel state estimator.

The entire nested codec/modem receiver 700 comprises the subsystems as shown in FIG. 7. The conventional subsystems such as the demodulator 701, the deinterleaver 702, the framing bit detector 703, and the descrambler 705 can be implemented by using well known techniques.

The channel decoder 704 finds estimates for X, Y and Z bits and consists of an optimum branch metric calculator and a Viterbi algorithm processor.

The availability of a fast and accurate channel estimation technique is desirable for the implementation of the adaptive rate voice codec. The transmitter should estimate the channel state as fast and as accurately as possible and adapt the decoded voice bit rate accordingly. Channel estimation techniques can be classified as closed loop and open loop techniques. Closed loop schemes are not feasible for mobile satellite channels. A useful approach to channel estimation is to compute the speech power spectral density. The received carrier power level, measured at the output of the AGC, also is a good indicator of the channel state. A distributed UW, serving as an in-band pilot, provides accurate and reliable channel estimate. When inserting the pilot in data stream the synch samples are interpolated to find an estimate for other symbols.

Both hard decision and soft decision techniques can be used to measure BER or C/N. Raw channel BER can be estimated in several ways. The simplest approach is to count the number of errors over the received UW. In an FEC coded system, the channel BER can be measured by simply reencoding the channel decoded data and comparing it with the received signal.

In the circuit of FIG. 7, the channel state estimator 710 receives a multiplicity of transmission link quality indicators such as the received carrier power level, C, partial- and/or full-correlation, U, of the received UW symbols with a reference signal, reliability of decoded bits, L, and BER of the received voice symbols, B. Any combination of these four indicators, or other means for estimating the channel state, can employed for implementing the channel state estimator in the nested codec receiver.

Figure 9:
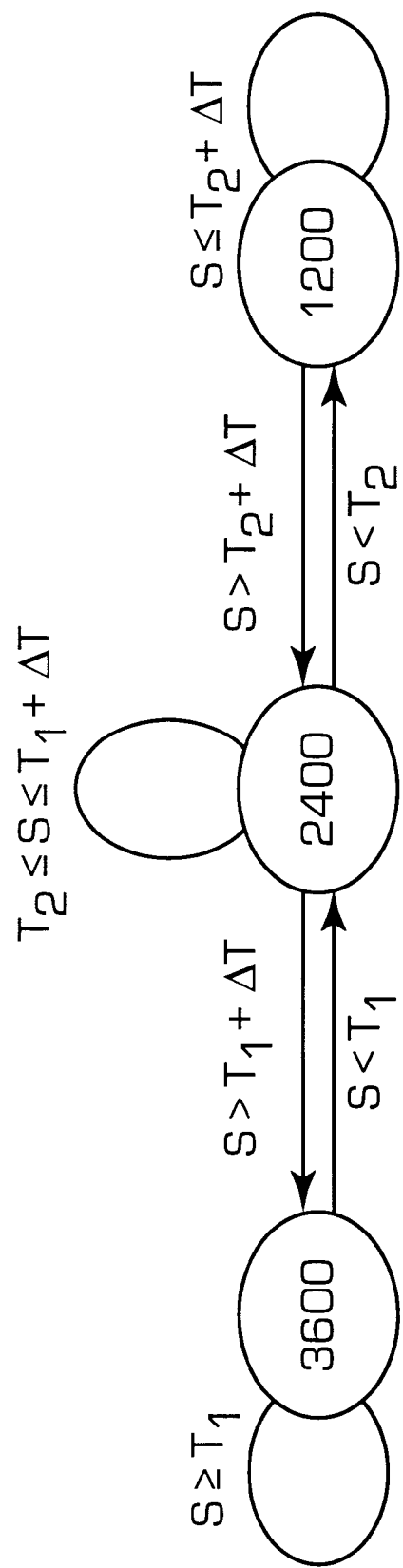
FIG. 9 is an illustration of an algorithm for adaptive voice bit rate selection useable with the present invention.

Let channel state condition be denoted by S. Then, S is a function of C, U, L, and B observed over a multiplicity of received voice frames. That is $S=f(C, U, L, B)$ Let $T_1$ and $T_2$ be real numbers, $T_1>T_2$, denoting two thresholds for the variable S. To avoid excessive transitions among different voice bit rates delivered to the user we also include some hysteresis, $\Delta T$, in the boundary of thresholds. Then, the voice decoder delivers 3600 bit/s, 2400 bit/s or 1200 bit/s voice to the user according to the following algorithm. FIG. 9 is a visual help to follow the algorithm where a circle shows the state of voice, V, being delivered to the user. For the present application V=3600, 2400, or 1200.

If V=3600 and $S \geq T1$, V=3600. Otherwise, V=2400.

If V=2400 and $S>T1+\Delta T$, V=3600.

If V=2400 and $S<T2$, V=1200. Otherwise, V=2400

If V=1200 and $S>T2+\Delta T$, V=2400. Otherwise, V=1200.

A block diagram of the decoder 800 for the nested voice codec is shown in FIG. 8 where the incoming block of 90 bits after forward error correction decoding is seen as 30 bit blocks at three different levels including one produced with strong FEC 810, level of 30 bits with moderate FEC 820 and a level of 30 bits with low FEC 830. The level 3 block of 30 bits 810 comprises a quanitized LSF parameter having 20 bits per block and is provided on line 841 to synthesis filtering unit 858 and adaptive post filtering unit 859. Block 810 further produces a gain signal of 4 bits per voice block on line 842 and a quantized pitch and voicing signal represented by 5 bits per voice block and 1 bit per block respectively on line 843. Out of the level 2 block of 30 bits, 820 is a residual magnitude DFT at sample point 100 represented by 15 bits per block on line 844 and a residual magnitude DFT at sample point 200 represented by 15 bits per block on line 845. These two lines are provided to a DFT magnitude interpolator 851 which interpolates across 0–100 and 100–200 samples, as well as a magnitude DFT interpolator 852 across 0–50, 50–100, 100–150 and 150–200 samples. The third interpolator 852 also receives residual magnitude DFT at sample point 50 represented by 15 bits per block on line 846 and residual magnitude DFT at sample point 150 represented by 15 bits per block on line 847. Blocks 851 and 852 further receive the gain bits on line 842 and the quantized pitch and voicing signals on line 843. A binary excitation in pulse sequence and random noise detector 850 further receives the gain and quantized pitch and voicing signals to produce an excitation for 1200 bits per second synthesis. The first DFT magnitude interpolator 851 provides its output to a first inverse DFT 853, which provides an output for excitation of a 2400 bits per second synthesis on line 849. The second level DFT magnitude interpolator 852 additionally produces an output to a second inverse DFT 855 which provides its own output for excitation of a 3600 bit per second synthesis on line 856. A linearly interpolated fundamental phase unit 854 provides inputs to both inverse DFT 853 and inverse DFT 855. The excitation inputs on lines 848, 849 and 856 are provided to a switch 857 which operates under control of a signals from FEC decoder for a rate control. The selected excitation line is provided to the synthesis filtering unit 858 and the filtered signal is provided to the adaptive post filtering unit 859 for reconstruction of the speech signal.

The S channel signal is detected in the manner illustrated in FIG. 7, wherein a channel state estimator 710 receives inputs from units that detect carrier power 720, unique word correlator 730, bit error rate estimator 740 and bit reliability unit 750.

While the present invention has been described in terms of a preferred embodiment, the scope of the invention is not limited thereto and is defined by the claims. For example, the nested code is not limited to three levels but may utilize any number of levels as suitable for a given application. Similarly, the allocation of bits is to those levels, or to information and overhead, is a matter of design choice. Further, the core level may comprise any one or more of the pitch, gain, voicing and spectral parameters, sufficient to produce intelligible speech when decoded alone. The other levels may be any voice parameters which are representable in a progressive manner, such as the excitation parameters described in the preferred embodiment, and may include vocal tract and spectral representations of the speech signal. The disclosed invention offers a highly flexible architecture for effective and efficient voice communication under varying environmental conditions.

What is claimed is:

1. A voice communication system having a transmitter for sending encoded voice signals in a digital bit stream over a communications medium to a receiver and being capable of providing automatic rate reduction under degraded conditions without transmit side control, said transmitter comprising a voice encoder and a channel encoder and said receiver comprising a channel decoder and a voice decoder, said voice encoder comprising:
   a nested voice codec which is responsive to input speech signals for generating a plurality of levels of encoded speech signals comprising a basic level and at least one other level, said basic level containing speech signals sufficient to reproduce at least an intelligible content of speech;
said channel encoder comprising:
   an encoder operative to encode said basic level and said at least one other level and to transmit at a constant data rate, said constant data rate being a full rate for said at least one other level and said basic level being at a subrate comprising an integral subset of said full data rate, said encoder for said basic level providing a higher level of error correction than said at least one other level; and
said receiver comprising:
   a channel state estimator operative to estimate a channel state condition and to produce a channel state selector signal, whereby said voice decoder is responsive to said selector signal for variable rate processing of a received signal and for decoding said received signal at said basic level when channel conditions are at a first quality level and said at least one other level when channel conditions are at a second quality level, where said first quality level is degraded with reslect to said second level.

2. A voice communication system as set forth in claim 1 wherein said at least one other level comprises voice parameters representative of voice in a progressive manner.

3. A voice communication system as set forth in claim 2 wherein said voice parameters comprise excitation spectral characteristics at predetermined sample points.

4. A voice communication system as set forth in claim 2 wherein said voice parameters comprise spectral representations of voice at predetermined sample points.

5. A voice communication system as set forth in claim 2 wherein said voice parameters comprise vocal tract representations of voice at predetermined sample points.

6. A voice communication system as set forth in claim 3 wherein said spectral characteristics comprise residual magnitude discrete Fourier transforms (DFT).

7. A voice communication system as set forth in claim 1 wherein each said other level is an integer multiple of said first level.

8. A voice communication system as set forth in claim 1 wherein said basic level comprising bits representing at least one of gain, pitch frequency, voicing and spectral parameters.

9. A voice communication system as set forth in claim 1 wherein said basic level comprises bits representing at least gain, pitch frequency, voicing and spectral parameters, and said transmitter further comprises a modulator, said modulator being operative to modulate said basic level with a first type of mapping at a first overall channel coding rate, and to modulate said other levels with at least a second type of mapping at a second overall channel coding rate, said first type of mapping being different from said second type of mapping and said first coding rate being more robust than said other coding rates.

10. A voice communication system as set forth in claim 1 wherein said transmitter comprises a unique word and framing bit generator and said receiver comprises a demodulator and a unique word and framing bit detector.

11. A voice communication system as set forth in claim 9 wherein said first type of mapping is a straight binary-type and said second-type, mapping is a Gray-type.

12. A voice communication system as set forth in claim 1 wherein said channel state estimator is responsive to at least one of detected carrier power, unique word correlator, bit error, and bit reliability.

13. A voice communication system as set forth in claim 1 wherein said receiver comprises at least one of a carrier power detector, a unique word correlator, a bit error estimator and a bit reliability detector for providing an input to said channel state estimator.

14. A voice communication system as set forth in claim 1 wherein said transmitter is operative to transmit said encoded voice signals at a predetermined maximum encoded rate.

15. A receiver for receiving a voice signal which is encoded by a nested voice codec into a basic level and at least another two higher nested levels and is transmitted, following channel encoding, unique word and framing bit generation, and modulation, at a predetermined constant bit rate comprising:
   a demodulator for demodulating said voice signal and producing a demodulated output;
   a detector for detecting a unique word and framing bits in said demodulated output;
   a channel decoder for decoding said demodulated output and producing a channel decoded output;
   a voice decoder for decoding a voice content of said channel decoded output; and a channel state estimator operative to estimate a channel state condition and to produce a channel state selector signal, whereby said voice decoder is responsive to said selector signal for variable bit rate processing of the voice content of said channel decoded output comprising decoding the voice content of said channel decoded output at said basic level when channel conditions are at a first quality level and at one of said at least another two higher nested levels when channel conditions are at a second quality level, where said first quality level is degraded with respect to said second level.

16. The receiver as set forth in claim 15 wherein said voice decoder is responsive to said channel selector for decoding said received signal using said predetermined constant bit rate and for decoding said received signal using a subset of said predetermined constant bit rate, said subset of bits permitting intelligible reconstruction of said voice signal at lower rates.

17. A voice communication system as set forth in claim 15 wherein said channel state estimator is responsive to at least one of detected carrier power, unique word correlator, bit error, and bit reliability.

18. A voice communication system as set forth in claim 15 wherein said receiver further comprises at least one of a carrier power detector responsive to said demodulator, a unique word correlator responsive to said unique word detector, a bit error estimator responsive to said framing bit detector, and a bit reliability detector responsive to said channel decoder, for providing an input to said channel state estimator.

19. A method of voice communication for conveying high quality speech signals between a transmitter and a receiver via a communications channel and being capable of providing automatic rate reduction under degraded conditions without transmit side control, comprising:

encoding said speech signals by generating a plurality of levels of encoded speech signals comprising a basic level and at least one other level, said basic level containing speech signals sufficient to reproduce at least an intelligible content of speech;

channel encoding said plural level encoded signals whereby said basic level is provided with a high level of error correction than said at least one other level; and transmitting said channel encoded signals in a digital bit stream at a constant bit rate over a communications medium;

receiving said transmitted digital bit stream;

channel decoding said received digital bit stream by variable bit rate processing said transmitted digital bit stream, estimating a channel state condition and producing a channel state selector signal and selectively decoding said channel decoded signals at said basic level when channel conditions are at a first quality level and said at least one other level when channel conditions are at a second quality level, where said first quality level is degraded with respect to said second level, into a voice signal in response to said selector signal.

20. A method of voice communication as set forth in claim 19 wherein said at least one other level comprises voice parameters representative of voice in a progressive manner.

21. A method of voice communication as set forth in claim 20 wherein said voice parameters comprise excitation spectral characteristics at predetermined sample points.

22. A method of voice communication as set forth in claim 20 wherein said channel state estimating step comprises at least one of detecting a carrier power, correlating a unique word, estimating a bit error and detecting a bit reliability.

* * * * *